United States Patent Office 2,770,250
Patented Nov. 13, 1956

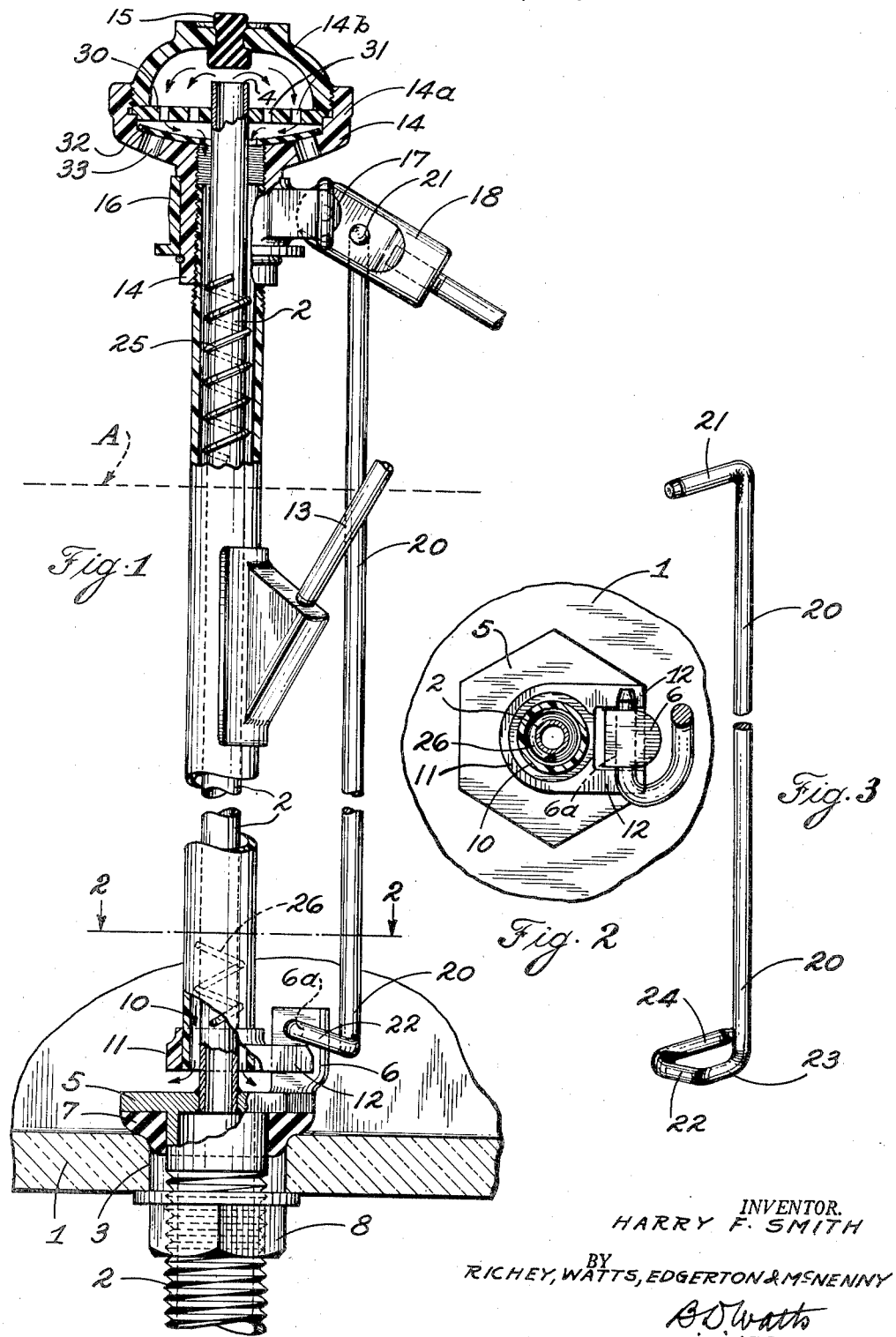

2,770,250
INLET VALVE FOR FLUSH TANKS

Harry F. Smith, Lexington, Ohio, assignor to Mansfield Sanitary Pottery, Inc., Perrysville, Ohio, a corporation of Ohio Application June 2, 1953, Serial No. 359,064

4 Claims. (Cl. 137—426)

This invention relates generally to inlet valves of the hush pipe type for flush tanks and is particularly concerned with a new inlet valve of the type shown in my United States Patent No. 2,607,364.

The apparatus of that patent has proven to be quite satisfactory in commercial use but for certain uses, it is too costly when made of metal and it requires adjustments which the unskilled worker may not be able to make correctly. The present invention aims to provide a new combination of elements, certain of which may be made of materials other than metal such, for example, as any suitable plastic composition and some of which are new. The present combination of elements consists of fewer parts than the prior devices and requires fewer adjustments and these adjustments may be correctly made even by the unskilled worker.

In the drawings accompanying and forming a part of this specification:

Fig. 1 is a side, elevational view, partly in section, showing an inlet valve embodying the present invention;

Fig. 2 is a cross-sectional view taken on line 2—2 of Fig. 1; and

Fig. 3 is a perspective view of one form of the adjustable strut.

In the figures, 1 designates a fragmentary part of the bottom wall of a flush tank and the horizontal dotted line A thereabove indicates the surface level of water in the tank.

An inlet pipe 2 extends through a hole 3 in the bottom wall 1 of the tank and at its upper, outlet end has a valve seat 4. Adjacent to the inner surface of the bottom wall 1 of the tank, the inlet pipe has a flange 5 and a post 6 extends upwardly therefrom and has a hole 7 therethrough. A gasket 7 around pipe 2 between flange 5 and the bottom wall 1 of the tank serves to seal the hole 3 against escape of water therethrough when a nut 8 is screwed upon the lower end of the inlet pipe and bears against the outer lower surface of wall 1.

A hush pipe 10 surrounds inlet pipe 2 and is movable endwise relative thereto. Near its lower outlet end, the hush pipe is provided with an annulus 11 having parallel, laterally extending fingers 12 to lie on opposite sides of post 6 and prevent rotation of the hush pipe relative to the inlet pipe. The hush pipe 10 may have a refill tube connnection 13 opening outwardly therefrom between its ends to receive a refill pipe.

A housing 14 is screw-threaded on the upper end portion of hush pipe 10 and carries a valve 15 to engage the seat at the outlet end of the inlet pipe. The housing 14 may be moved circumferentially and endwise relative to the hush pipe simply by turning it around the pipe.

A collar 16 loosely encircles the housing 12 between its ends and permits ready rotation of the housing relative to the collar. The collar 16 has laterally projecting ears 17 to which one end of a float-carrying lever 18 is pivoted.

A strut 20 is pivotally connected to post 6 and also to lever 18 between its ends and preferably fairly close to its pivotal connection to collar 16. This strut 20 has a substantially straight portion 21 at its upper end which extends at substantially right angles to the body part of the strut and is positioned in a hole in lever 18 and serves as a pivot about which the lever may turn as the water level in the tank rises and falls. The strut 20 has a substantially U-shaped portion 22 at its lower end. This portion 22 has legs 23 and 24 which are substantially parallel to the upper end portion 21. The portion 21 and leg 24 extend in opposite directions and the latter projects through a hole in post 6 above the fingers 12 and acts as a stop limiting the valve opening movement of the hush pipe 10 in response to the movement of the float lever.

Preferably, axially short lengths of coiled wires 25 and 26 are wound around and secured to the outer surface of the inlet pipe near its outlet end and near post 6 for the purpose of causing turbulence in the outflowing water and thereby reducing the noise created by the water. The outer diameter of these wires is slightly less than the inner diameter of the hush pipe by reason of which a tubular stream of water may flow along the inner surface of the hush pipe. Water may also flow between the turns of the wires 25 and 26 and thus at an angle to the tubular stream just mentioned. Since these two streams intersect at a multitude of places and cause turbulence wherever they intersect, the velocity of the water is rapidly decreased and the noise of the flowing water is kept at a minimum.

It will be understood that the hush pipe with its annulus 11, refill tube connection 13, housing 14, collar 16 and part of lever 18 may be composed of materials other than metal such as Bakelite, or any suitable plastic material.

It will also be understood that when the housing 14 is rotated it will be moved endwise on the hush pipe and since the upper end portion 21 of strut 20 is fixed relative to the valve at the outlet end of the inlet pipe, such rotation increases and decreases the extent of opening of the valve. If and when it is desired to raise or lower the surface level of water in the tank, the U-shaped lower portion 22 of strut 20 is tuned about the axis of leg 23 of the U-shaped portion with resultant shifting of the position of the upper portion 21 of the strut relative to the valve seat. Thus the position of the float lever is shifted and the surface level of water in the tank is moved up or down depending on the direction of turning of portion 22.

From the foregoing description, it will be clear that the only adjustments required are manual rotation of the housing 14 on the hush pipe to increase or decrease the extent of opening of the valve and a turning of the U-shaped portion 22 of the strut which may be accomplished by using a pair of pliers.

The housing 14 with its enclosed parts is quite like the apparatus shown, described and claimed in my copending application Serial No. 61,647, filed November 23, 1948, now Patent No. 2,667,177, issued January 26, 1954. In the present case the housing 14 is made of upper and lower parts 14a and 14b, respectively, which parts are screw-threaded together and clamped between opposed annular edge surfaces, a rigid partition 30 which is provided with a plurality of small holes 31 through which water may flow out of the upper chamber, i. e., the one defined by the upper part 14a of the housing and this partition 30. These holes are so small that they will not trap grains of sand and the like and are so numerous that their total cross-sectional area exceeds that of the inlet pipe 2. A flexible, resilient ring 32 is disposed in the lower part 14a of housing 14 beneath partition 30. This ring 32 is freely movable in the chamber in which it is located since its outer periphery does not closely engage the inner adjacent wall of the housing, since its inner periphery does not closely engage the outer surface of the inlet pipe 2, and since it is flexible and resilient. The lower portion 14a of housing 14 is provided with a plurality of air inlet holes 33.

When housing 14 is raised and valve 15 is moved away from the valve seat at the end of inlet pipe 2, water under pressure flows into the upper chamber of housing 14, thence through the holes 31 in partition 30 and impinges against the upper side of ring 32, forcing it down to the position shown in Fig. 1 where the ring 32 covers holes 33. The water escapes from the lower chamber of the housing into the hush pipe 10 and flows downwardly in the space between the hush pipe and the inlet pipe eventually escaping at the lower end of the hush pipe, all as indicated by arrows. When the housing 14 is lowered and valve 15 seats on the end of inlet pipe 2 and shuts off the flow of water into the upper chamber of the housing 14, the resilient ring 32 tends to resume its normal position substantially parallel to partition 30, thus opening air inlet holes 33 so that in case there is any fall in pressure in the inlet pipe 2, air will be drawn in through holes 33 and thence into the interior of the hush pipe, thereby breaking any siphon which may exist and preventing the withdrawal of water from the tank into the inlet pipe.

Having thus described the present invention so that others skilled in the art may be able to understand and practice the same, I state that what I desire to secure by Letters Patent is defined in what is claimed.

What is claimed is:

1. In a flush tank, an inlet pipe having a valve seat at its discharge end, an endwise movable hush pipe around said inlet pipe, stop means engageable with said hush pipe to limit the extent of its endwise movement, a housing carrying a valve to engage said seat and connected to one end of said hush pipe for circumferential and endwise movement thereon to vary the extent of opening of the valve, a collar surrounding and loosely engaging said housing for substantially non-axial rotational movement relative thereto, a float-carrying lever pivotally connected to said collar, and a strut having one end portion connected to said lever and the other end portion U-shaped and positioned transversely of the strut with the free leg thereof pivotally connected to the inlet pipe adjacent to the outlet end of the hush pipe, said U-shaped portion being manually adjustable about a horizontal axis to vary the water level.

2. In a flush tank, an inlet pipe having a valve seat at its discharge end, an endwise movable hush pipe around said inlet pipe, stop means engageable with said hush pipe to limit the extent of its endwise movement, a housing carrying a valve to engage said seat and connected to one end portion of said hush pipe for circumferential and endwise movement thereon to vary the extent of opening of the valve, a collar surrounding and loosely engaging said housing for substantially non-axial rotational movement relative thereto, a float-carrying lever pivotally connected to said collar, and a strut having oppositely extending, parallel end portions, one end portion being substantially straight and connected to said float-carrying lever and the other being U-shaped and positioned transversely of the strut with the free leg pivotally connected to the inlet pipe adjacent to the outlet end of the hush pipe, said U-shaped portion being manually adjustable about a horizontal axis to vary the water level.

3. In a flush tank, an inlet pipe having a valve seat at its discharge end, an endwise movable hush pipe around said inlet pipe, a housing carrying a valve to engage said seat and connected to one end portion of said hush pipe for circumferential and endwise movement thereon to vary the extent of opening of the valve, an annulus around the other end of the hush pipe, a collar surrounding and loosely engaging said housing for substantially non-axial rotational movement relative thereto, a float-carrying lever pivotally connected to said collar, a strut having oppositely extending, parallel end portions, one end portion being pivotally connected to said float-carrying lever and the other being substantially U-shaped, being positioned transversely of the strut, said U-shaped portion being manually adjustable about a horizontal axis to vary the water level and pivotally connected to the inlet pipe adjacent to and engageable with said annulus, the hush pipe having a laterally projecting portion engageable with the adjacent end of said strut to limit the endwise movement of the hush pipe.

4. In a flush tank, an inlet pipe having a valve seat at its discharge end, a post connected to and substantially parallel to the inlet pipe, an endwise movable hush pipe around said inlet pipe, a housing carrying a valve to engage said seat and connected to one end portion of said hush pipe for circumferential and endwise movement thereon to vary the extent of opening of the valve, an annulus around the other end of the hush pipe and having lateral fingers disposed on opposite sides of said post, a collar surrounding and loosely engaging said housing for substantially non-axial rotational movement relative thereto, a float-carrying lever pivotally connected to said collar, a strut having oppositely extending, parallel end portions, one end portion being pivotally connected to said float-carrying lever and the other being substantially U-shaped, positioned transversely of the strut, pivotally connected to said post, manually adjustable about a horizontal axis to vary the water level, and engageable with said fingers to act as a stop for limiting endwise valve opening movement of the hush pipe.

References Cited in the file of this patent

UNITED STATES PATENTS

| | | |
|---|---|---|
| 1,257,231 | Hill | Feb. 19, 1918 |
| 1,606,274 | Utley | Nov. 9, 1926 |
| 2,607,364 | Smith | Aug. 19, 1952 |
| 2,667,177 | Smith | Jan. 26, 1954 |